United States Patent
Nakagawa et al.

(10) Patent No.: US 8,167,188 B2
(45) Date of Patent: May 1, 2012

(54) FRICTION STIR WELDING METHOD

(75) Inventors: Koichi Nakagawa, Tokyo (JP); Qing Liu, Shenzhen (CN); Isao Shiozawa, Tokyo (JP); Takeo Nakagawa, Tokyo (JP)

(73) Assignees: Hong Fu Jin Precision Industry (ShenZhen) Co., Ltd, Shenzhen, Guangdong Province (CN); Hon Hai Precision Industry Co., Ltd., Tu-Cheng, New Taipei (TW); FINE TECH Corporation, Tokyo (JP)

( * ) Notice: Subject to any disclaimer, the term of this patent is extended or adjusted under 35 U.S.C. 154(b) by 0 days.

(21) Appl. No.: 13/246,982

(22) Filed: Sep. 28, 2011

(65) Prior Publication Data

US 2012/0018492 A1    Jan. 26, 2012

Related U.S. Application Data

(62) Division of application No. 12/728,387, filed on Mar. 22, 2010, now Pat. No. 8,052,033.

(30) Foreign Application Priority Data

Dec. 3, 2009   (CN) .......................... 2009 1 0310831

(51) Int. Cl.
*B23K 20/12*   (2006.01)

(52) U.S. Cl. ..................................... 228/112.1; 228/2.1

(58) Field of Classification Search .......................... None
See application file for complete search history.

(56) References Cited

U.S. PATENT DOCUMENTS

| | | | |
|---|---|---|---|
| 5,611,479 A * | 3/1997 | Rosen .......................... | 228/112.1 |
| 2001/0007717 A1* | 7/2001 | Ezumi et al. .................. | 428/609 |
| 2003/0019913 A1* | 1/2003 | Ezumi et al. .................. | 228/112.1 |
| 2003/0057258 A1* | 3/2003 | Ishida et al. .................. | 228/104 |
| 2003/0085257 A1* | 5/2003 | James et al. .................. | 228/112.1 |
| 2003/0098336 A1* | 5/2003 | Yamashita .................. | 228/112.1 |
| 2003/0102354 A1* | 6/2003 | Okamura et al. .......... | 228/112.1 |
| 2003/0205565 A1* | 11/2003 | Nelson et al. .................. | 219/148 |
| 2004/0020970 A1* | 2/2004 | Palm .......................... | 228/112.1 |
| 2004/0211819 A1* | 10/2004 | Ezumi et al. .................. | 228/112.1 |
| 2005/0115456 A1* | 6/2005 | Nakamura et al. ............. | 105/396 |
| 2006/0086775 A1* | 4/2006 | Trapp et al. .................. | 228/112.1 |
| 2006/0151576 A1* | 7/2006 | Akiyama et al. ............ | 228/112.1 |
| 2007/0044406 A1* | 3/2007 | Van Aken et al. ............... | 52/459 |
| 2008/0011810 A1* | 1/2008 | Burford .......................... | 228/2.1 |
| 2009/0134203 A1* | 5/2009 | Domec et al. ............... | 228/112.1 |
| 2009/0297761 A1* | 12/2009 | Nakayama .................... | 428/114 |
| 2010/0001133 A1* | 1/2010 | Kempa et al. ............... | 244/118.6 |

(Continued)

FOREIGN PATENT DOCUMENTS

JP   2003-181655 A  *  7/2003

(Continued)

*Primary Examiner* — Kiley Stoner
(74) *Attorney, Agent, or Firm* — Altis Law Group, Inc.

(57) ABSTRACT

A friction stir welding method includes providing a joining tool including a friction surface, a first workpiece, and a second workpiece, and arranging the first workpiece and second workpiece in position with a first joining surface abutting a second joining surface. A friction surface of a joining tool resists at least one of the first treating surface and the second treating surface, and the first workpiece and the second workpiece cooperatively define a slot. Then positioning, rotating, and moving the joining tool to rub and stir at least one of the first workpiece and the second workpiece, thus plasticizing at least part of the first workpiece and the second workpiece to join the first workpiece and the second workpiece.

7 Claims, 14 Drawing Sheets

U.S. PATENT DOCUMENTS

2010/0159265 A1 * 6/2010 Fairchild et al. ............... 428/586

FOREIGN PATENT DOCUMENTS

| | | | | |
|---|---|---|---|---|
| JP | 2003-326371 | A | * | 11/2003 |
| JP | 2003-326378 | A | * | 11/2003 |
| JP | 2007-301579 | A | * | 11/2007 |
| JP | 2009-101423 | A | * | 5/2009 |
| JP | 2009-208121 | A | * | 9/2009 |
| JP | 2009-297761 | A | * | 12/2009 |
| KR | 2008-057965 | | * | 6/2008 |

* cited by examiner

FRICTION STIR WELDING METHOD

CROSS-REFERENCE TO RELATED APPLICATION

The present application is a divisional application of U.S. patent application Ser. No. 12/728,387, filed on Mar. 22, 2010, now U.S. Pat. No. 8,052,033, which claims all benefits accruing under 35 U.S.C. §119 from CN 200910310831.8, filed on Dec. 3, 2009, the contents of which are hereby incorporated by reference.

BACKGROUND

1. Technical Field

The present disclosure generally relates to friction stir welding, and particularly, to a friction stir welding method using a joining tool without a mixing pin.

2. Description of Related Art

Friction stir welding is widely used to join aluminum alloy because it is simple to perform.

A metal structure of the stirred product can be constituently uneven, since the material of the stirred portion of the product plastically flows in the friction stir welding process. After treatment, the different areas, specifically the stirred and unstirred portions of the product, may exhibit different aspects, wherein the joining portion of the workpieces provides an unfavorable appearance. Despite product annealing, the difference of the joined portion persists. Therefore, this can not satisfy a product with the stirred surface presented as an outer surface.

Achievement of a favorable appearance in products obtained by friction stir welding remains a challenge.

Therefore, an improved friction stir welding method is desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
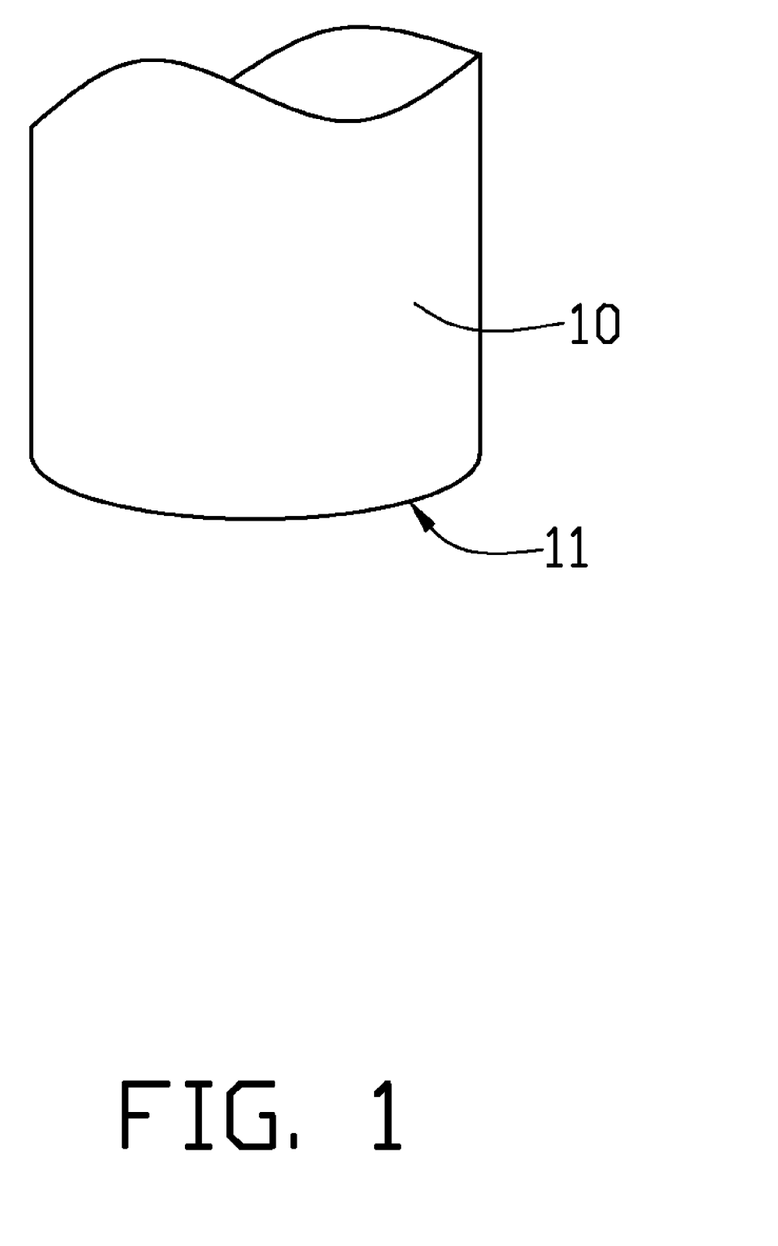
FIG. 1 is a schematic view of a joining tool used in an embodiment of a friction stir welding method of the disclosure.
Figure 2:
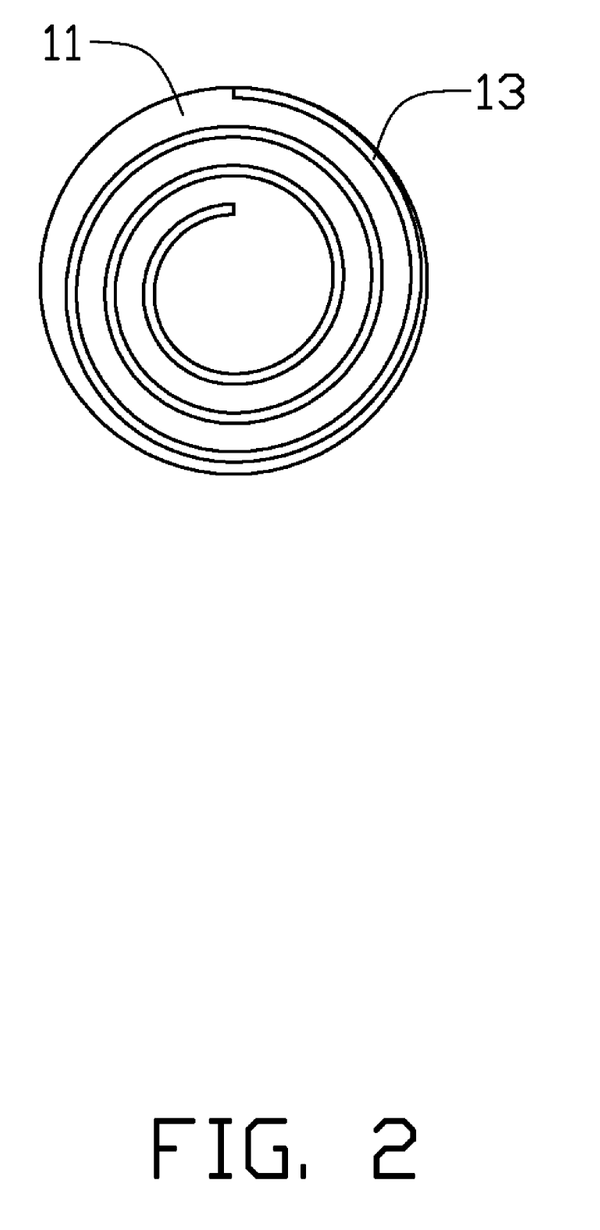
FIG. 2 is a bottom view of the joining tool of FIG. 1.
Figure 3:
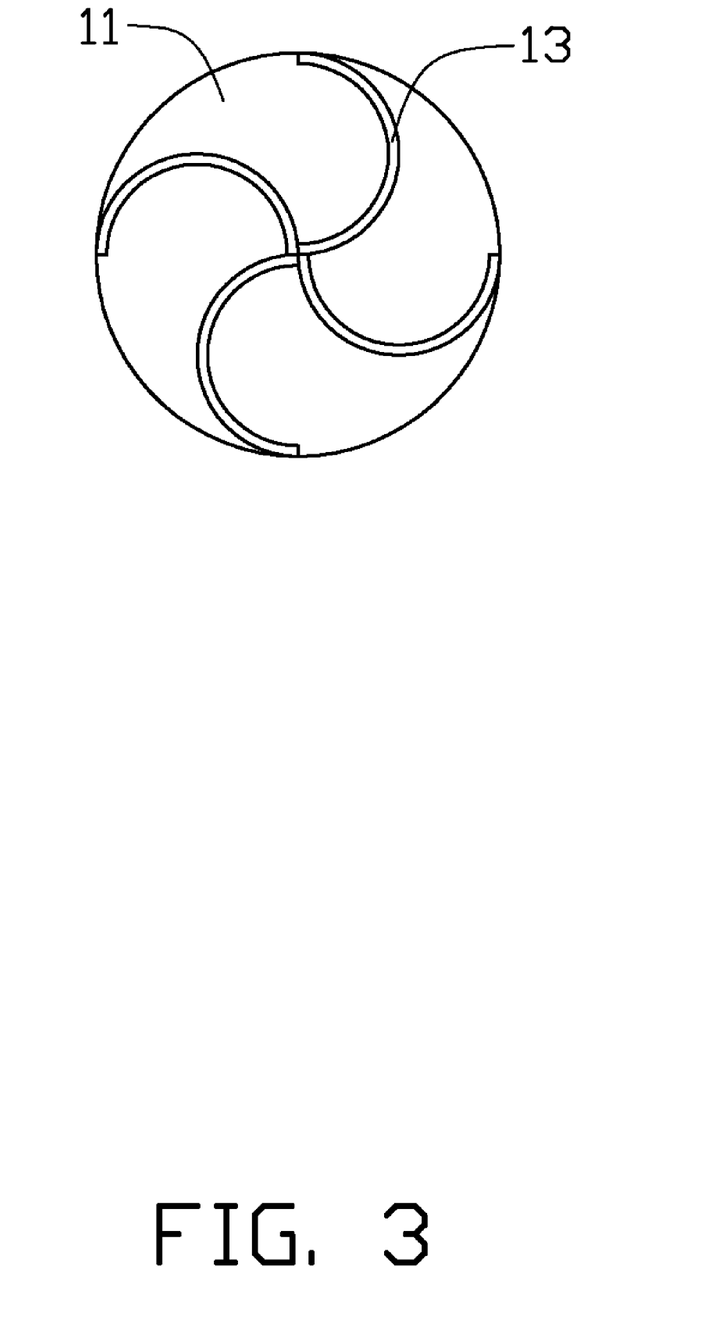
FIG. 3 is a bottom view of another joining tool.
Figure 4:
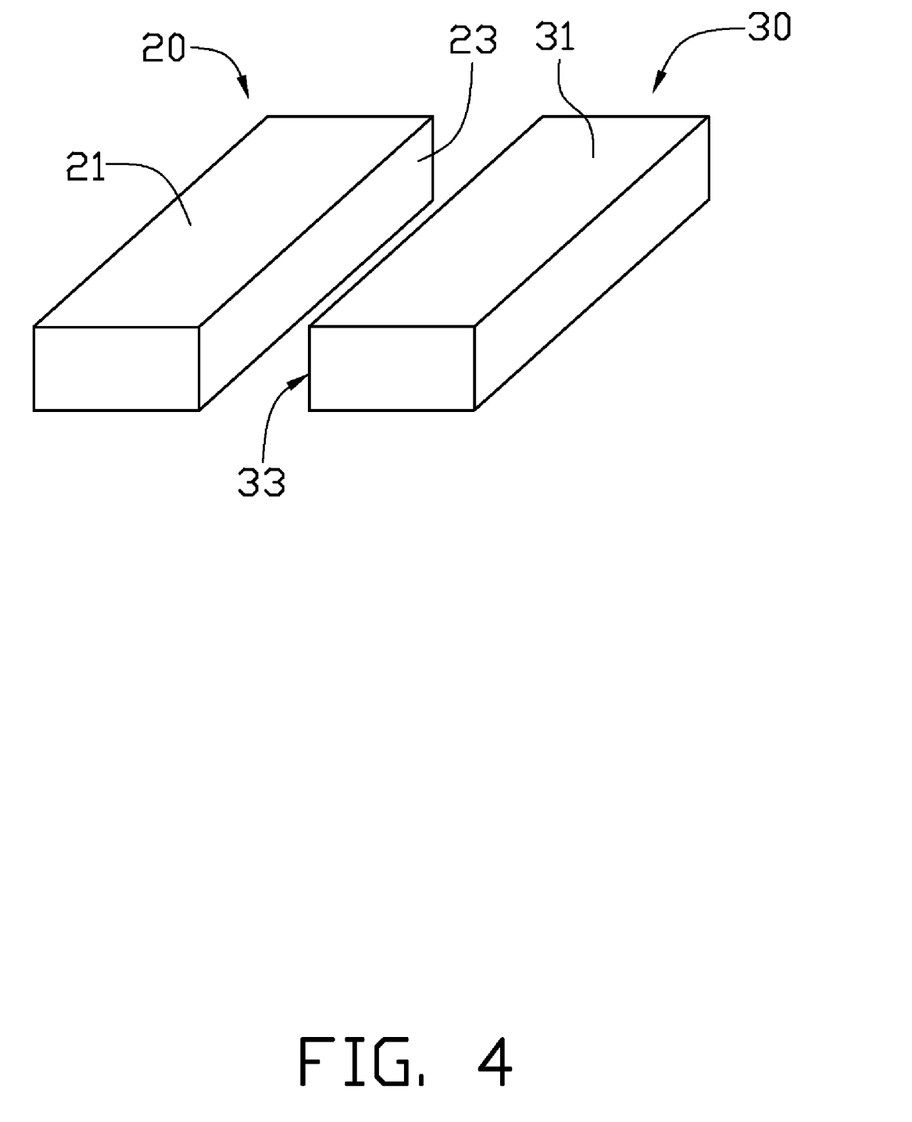
FIG. 4 is a schematic view of a first workpiece and a second workpiece to be joined.

Referring to FIG. 1 and FIG. 4, a joining tool 10 is used to join a first workpiece 20 and a second workpiece 30. The joining tool 10 is substantially cylindrical and includes a friction surface 11. The friction surface 11 is substantially flat. The joining tool 10 defines a slot 13 in the friction surface 11. The slot 13 may be spiral as shown in FIG. 2, and may include a plurality of curved slots starting at a rotation axis of the joining tool 10, as shown in FIG. 3.

Referring to FIG. 4, the first workpiece 20 includes a first treating surface 21 and a first joining surface 23 substantially perpendicular thereto. The second workpiece 30 includes a second treating surface 31 and a second joining surface 33 substantially perpendicular to the second treating surface 31.

Figure 5:
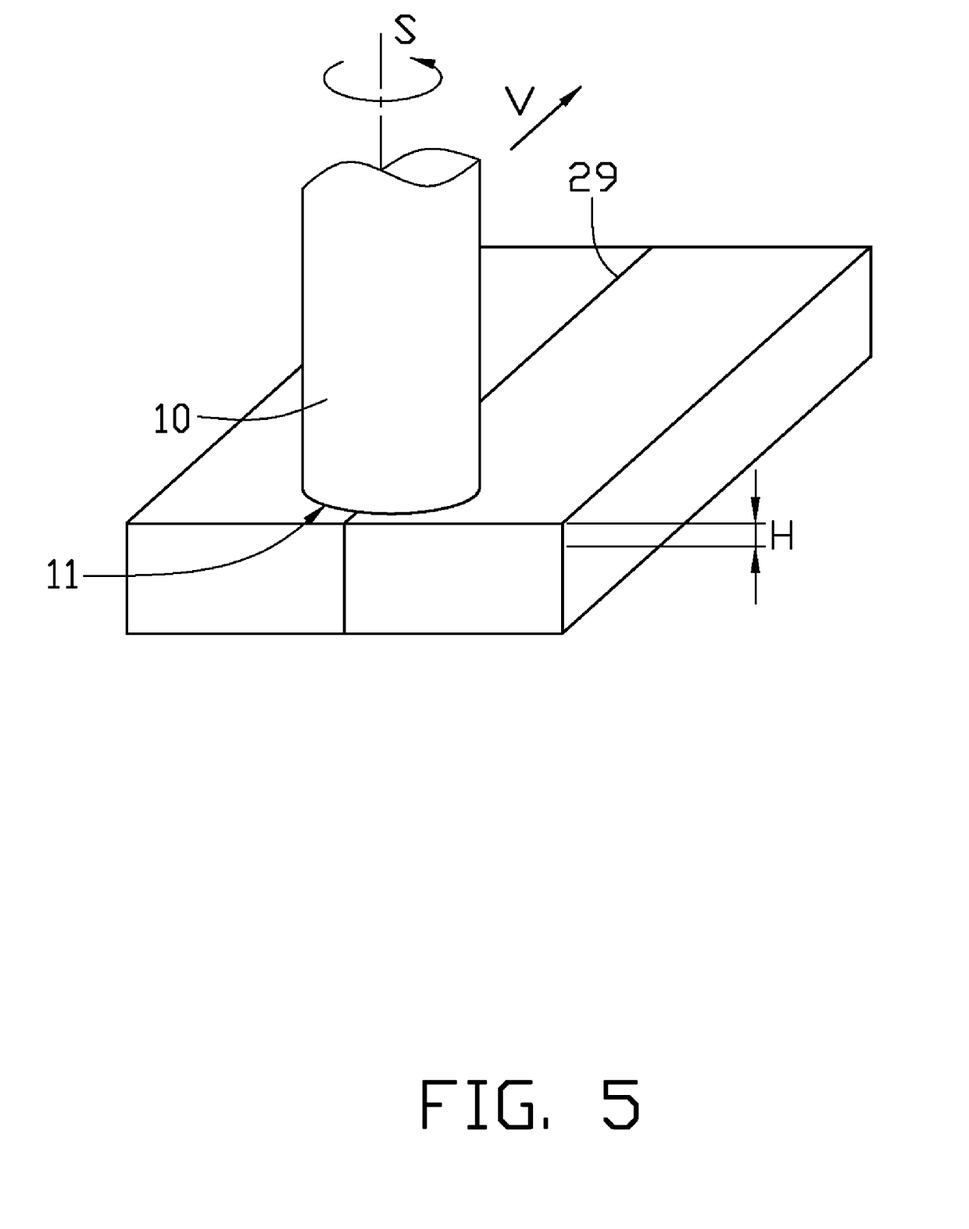
FIG. 5 is a schematic view showing the joining tool friction stirring the first workpiece and the second workpiece.

Referring to FIG. 4 and FIG. 5, the first workpiece 20 and the second workpiece 30 abut against each other, thereby defining a joint line 29. The first joining surface 23 contacts the second joining surface 33, and the first treating surface 21 and the second treating surface 31 are on the same plane. The first workpiece 20 and the second workpiece 30 are positioned in place by a clamp (not shown). The friction surface 11 of the joining tool 10 resists the first treating surface 21 and the second treating surface 31 and corresponds to the joint line 29. The joining tool 10 rotates along an axis thereof relative to the first workpiece 20 and the second workpiece 30 and moves along the joint line 29. Thus, the joining tool 10 rubs and stirs surface layers of the first workpiece 20 and the second workpiece 30, such that material of the first treating surface 21 of the first workpiece 20 and second treating surface 31 of the second workpiece 30, adjacent to the joint line 29, are rubbed and stirred. Heat generated by friction and stirring is transferred to the unstirred material adjacent to the first joining surface 23 and the second joining surface 33. The joining tool 10 produces a local region of highly plasticized material such that material of the first workpiece 20 and the second workpiece 30 diffuse among each other. As such, the first workpiece 20 and the second workpiece 30 are joined.

In the joining method as disclosed, a rotation direction of the joining tool 10 is the same as an extending direction from a center to a periphery of the joining tool 10. The joining tool 10 rotates at a high speed and moves at a low speed, and an end of the joining tool 10 extends slightly into the first workpiece 20 and the second workpiece 30. A rotation speed S, moving speed V, and stirred depth H of the first workpiece 20 and the second workpiece 30 are determined by various factors, such as the material and thickness of the first workpiece 20 and the second workpiece 30, and the size and material of the joining tool 10, so long as the first workpiece 20 and the second workpiece 30 can be joined. In the illustrated embodiment, the first workpiece 20 and the second workpiece 30 are aluminum alloy plates; the rotation speed S is about 7000 rpm, the moving speed V is about 500 mm/min, and the stirred depth H is about 0.15 mm.

Figure 6:
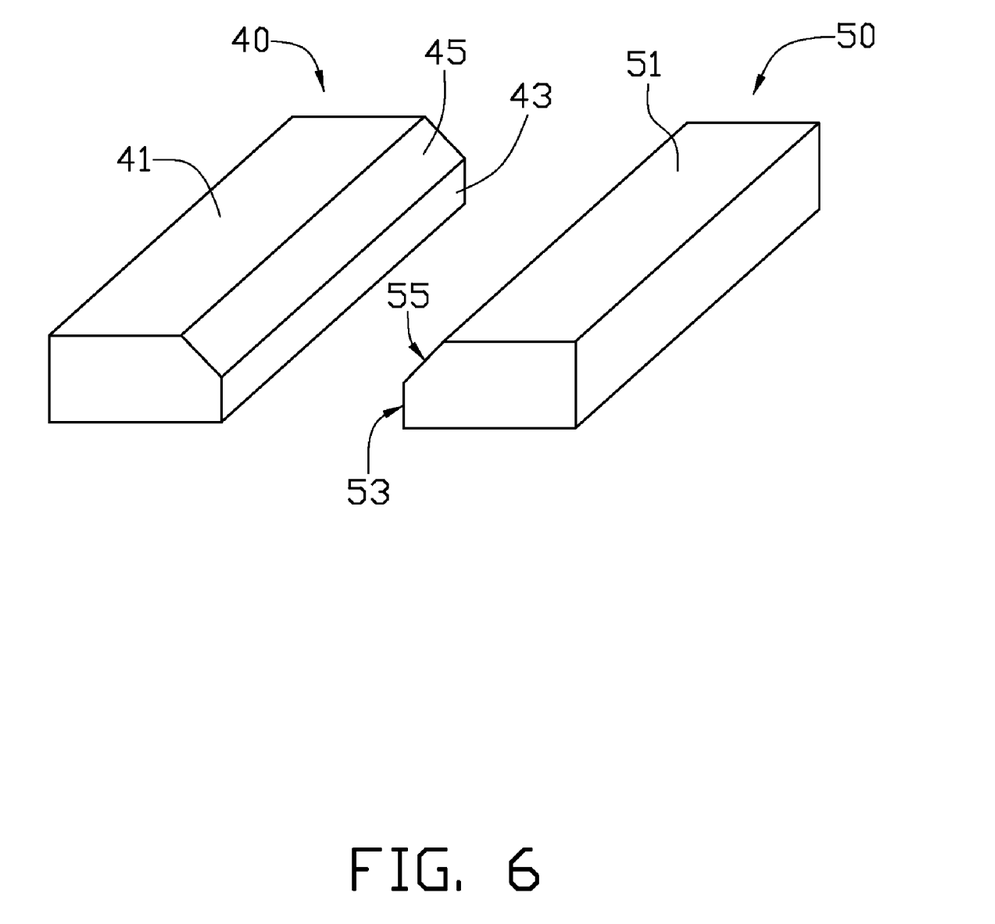
FIG. 6 is a schematic view of a third workpiece and a fourth workpiece to be joined.
Figure 7:
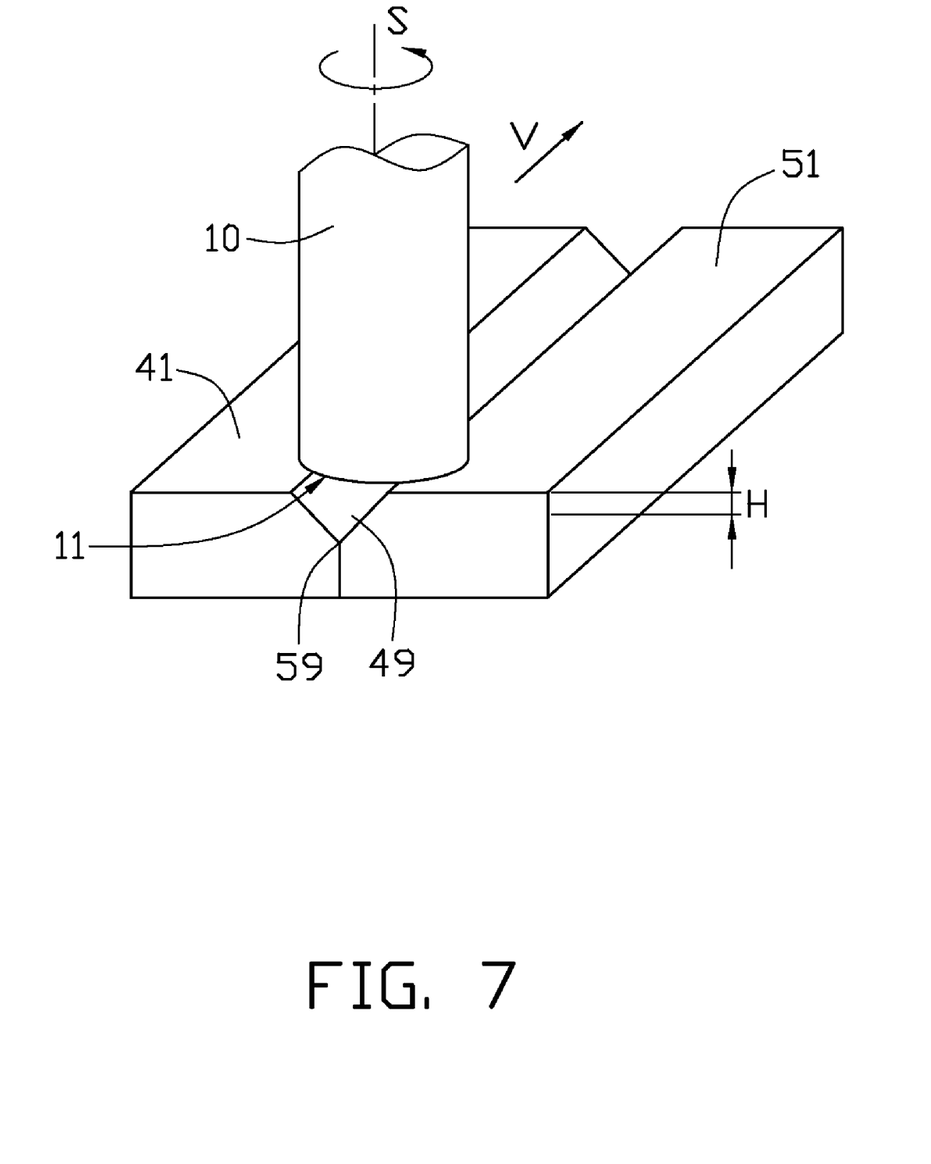
FIG. 7 is a schematic view showing the joining tool friction stirring the third workpiece and the fourth workpiece.
Figure 8:
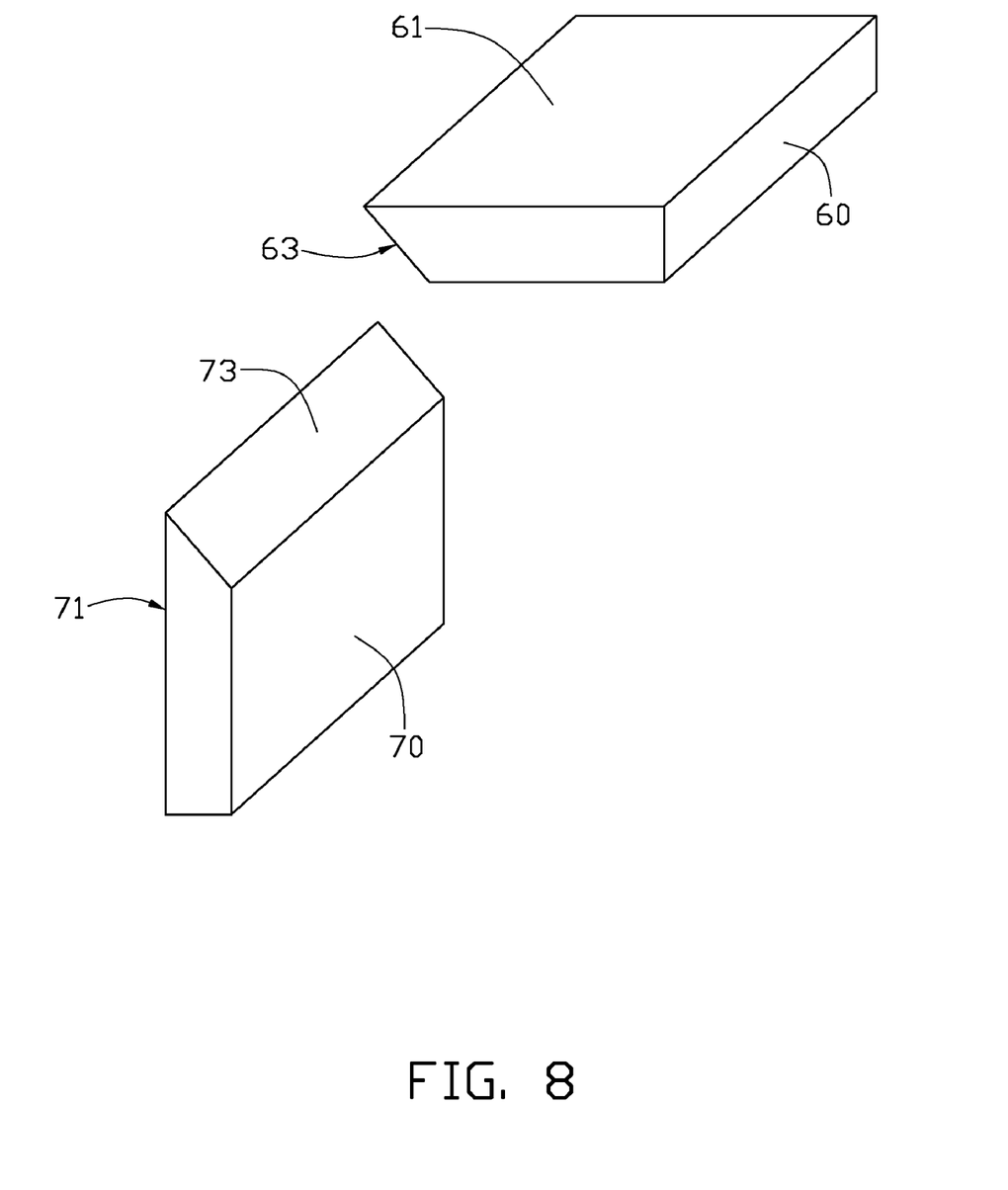
FIG. 8 is a schematic view of a fifth workpiece and a sixth workpiece to be joined.

Referring to FIG. 1, FIG. 6 and FIG. 7, a third workpiece 40 and a fourth workpiece 50 joined by the joining tool 10 are shown. The third workpiece 40 includes a third treating surface 41 and a third joining surface 43 substantially perpendicular to the third treating surface 41. The third workpiece 40 further includes an inclined connecting surface 45 joining the third treating surface 41 and the third joining surface 43. The fourth workpiece 50 includes a fourth treating surface 51 and a fourth joining surface 53 substantially perpendicular to the fourth treating surface 51. The fourth workpiece 50 further includes an inclined connecting surface 55 joining the fourth treating surface 51 and the fourth joining surface 53.

The third workpiece 40 and the fourth workpiece 50 abut against each other, thereby defining a joint line 59. The connecting surfaces 45, 55 define a slot 49. The third joining surface 43 contacts the fourth joining surface 53. The third treating surface 41 and the fourth treating surface 51 are on the same plane. The third workpiece 40 and the fourth workpiece 50 are positioned in place by a clamp (not shown). The friction surface 11 of the joining tool 10 resists the third treating surface 41 and the fourth treating surface 51 and corresponds to the slot 49. The joining tool 10 rotates along the axis thereof relative to the third workpiece 40 and the fourth workpiece 50 and moves along the joint line 59. Thus, the joining tool 10 produces a local region of highly plasticized material such that the third workpiece 40 and the fourth workpiece 50 diffuse among each other. As such, the third workpiece 40 and the fourth workpiece 50 are joined. Some plasticized material flows in the slot 49 and fills the slot 49, thus enhancing the joint strength of the third workpiece 40 and the fourth workpiece 50.

In the joining method disclosed, a rotation direction of the joining tool 10 is the same as an extending direction from a center to a periphery of the joining tool 10. The joining tool 10 rotates at a high speed and moves at a low speed, and an end of the joining tool 10 extends slightly into the third workpiece 40 and the fourth workpiece 50. A rotation speed S, moving speed V, and stirred depth H of the third workpiece 40 and the fourth workpiece 50 are determined by various factors, such as the material and thickness of the third workpiece 40 and the fourth workpiece 50, and the size and material of the joining tool 10, so long as the third workpiece 40 and the fourth workpiece 50 can be joined. In the illustrated embodiment, the third workpiece 40 and the fourth workpiece 50 are aluminum alloy plates; the rotation speed S is about 7000 rpm, the moving speed V is about 500 mm/min, and the stirred depth H is about 0.15 mm.

Referring to FIG. 1 and FIG. 8 through FIG. 10, a fifth workpiece 60 and a sixth workpiece 70 joined by the joining tool 10 are shown. The fifth workpiece 60 includes a fifth treating surface 61 and a fifth joining surface 63 facing the fifth treating surface 61. The sixth workpiece 70 includes a sixth treating surface 71 and a sixth joining surface 73 facing the sixth treating surface 71. However, unlike the previous workpieces, the fifth treating surface 61 and fifth joining surface 63, and sixth joining surface 73 and sixth treating surface 71 are non-perpendicular, disposed with an angle formed therebetween.

Figure 9:
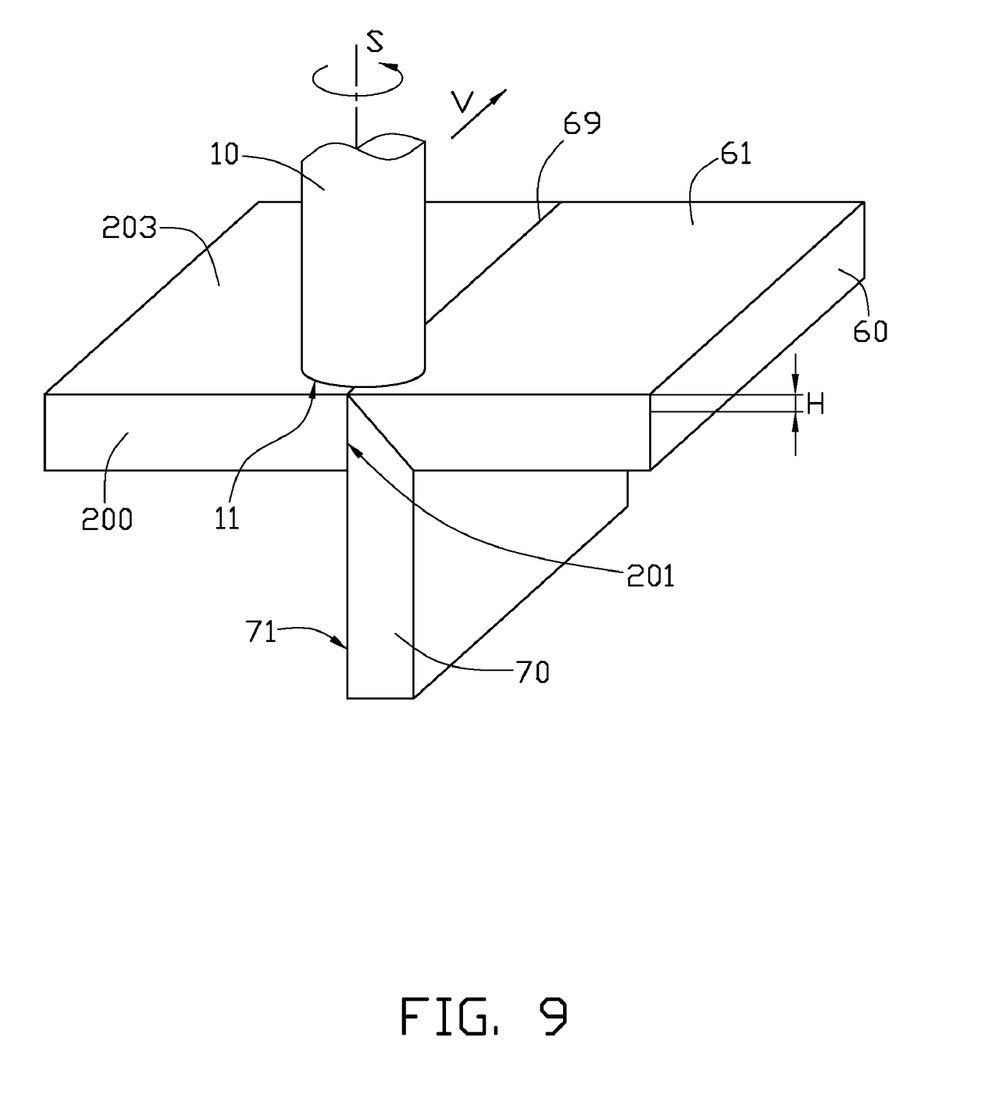
FIG. 9 is a schematic view showing the joining tool friction stirring the fifth workpiece and the sixth workpiece.
Figure 10:
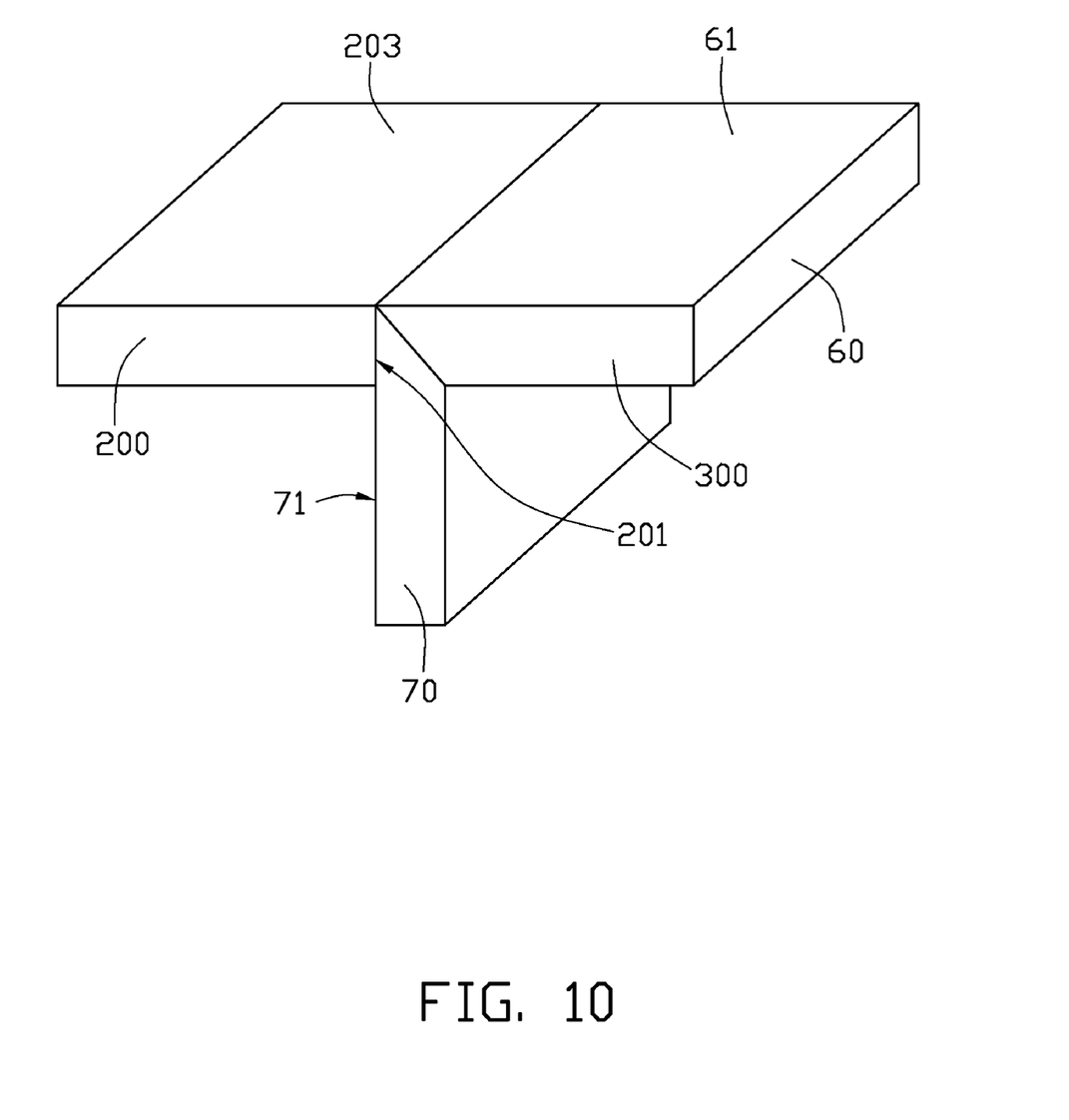
FIG. 10 is a schematic view showing the fifth workpiece and the sixth workpiece joined.

During joining of the fifth workpiece 60 and the sixth workpiece 70, the fifth workpiece 60 and the sixth workpiece 70 are arranged together and angled to each other, with the fifth joining surface 63 contacting the sixth joining surface 73, and the fifth treating surface 61 and the sixth treating surface 71 perpendicular to each other. A joint line 69 is defined at the joining portion of the fifth workpiece 60 and the sixth workpiece 70. The fifth workpiece 60 and the sixth workpiece 70 are positioned in place by a clamp (not shown). The friction surface 11 of the joining tool 10 resists the fifth treating surface 61. The joining tool 10 rotates along the axis thereof relative to the fifth workpiece 60 and the sixth workpiece 70 and moves along the joint line 69. Thus, the joining tool 10 produces a local region of highly plasticized material such that material of the fifth workpiece 60 and the sixth workpiece 70 diffuse among each other. As such, the fifth workpiece 60 and the sixth workpiece 70 are joined to form a product 300.

In the joining method disclosed, a rotation direction of the joining tool 10 is the same as the extending direction from a center to a periphery of the joining tool 10. The joining tool 10 rotates at a high speed and moves at a low speed, and an end of the joining tool 10 extends slightly into the fifth workpiece 60 and the sixth workpiece 70. A rotation speed S, moving speed V, and stirred depth H of the fifth workpiece 60 and the sixth workpiece 70 are determined by various factors, such as the material and thickness of the fifth workpiece 60 and the sixth workpiece 70, and the size and material of the joining tool 10, so long as the fifth workpiece 60 and the sixth workpiece 70 can be joined. In the illustrated embodiment, the fifth workpiece 60 and the sixth workpiece 70 are aluminum alloy plates, the rotation speed S is about 7000 rpm, the moving speed V is about 500 mm/min, and the stirred depth H is about 0.15 mm.

An angle is defined by the fifth treating surface 61 and the sixth treating surface 71, such that the joint line 69 is in a corner. That is, the joint line 69 is superposed to an edge line. As such, the joint line 69 is hidden. The angle defined by the fifth treating surface 61 and the sixth treating surface 71 may be any degree other than 0° and 180°. In the illustrated embodiment, the angle is about 90°.

Further, an assisting member 200 can be provided to resist the sixth workpiece 70. The assisting member 200 includes a first end surface 201 and a second end surface 203 substantially perpendicular to the first end surface 201. The first end surface 201 of the assisting member 200 resists the sixth treating surface 71 of the sixth workpiece 70 and the second end surface 203 of the assisting member 200 is on the same plane as the fifth treating surface 61 of the fifth workpiece 60.

With the assisting member 200, the friction and stirred area increases, as does the friction heat. The increased heat is transmitted to the fifth workpiece 60 and the sixth workpiece 70 to enhance connection therebetween.

In the embodiment, after the first workpiece 20 is joined to the second workpiece 30, the third workpiece 40 is joined to the fourth workpiece 50, and the fifth workpiece 60 is joined to the sixth workpiece 70, surface layers adjacent to the treating surfaces 21, 31, 41, 51, 61, 71 may be removed. That is, material with a changed metal structure is removed and material with unchanged metal structure is exposed. Therefore, a product formed by the above described friction stir welding method can provide a favorable appearance, even if subsequent treatment, such as an anodic process.

Figure 11:
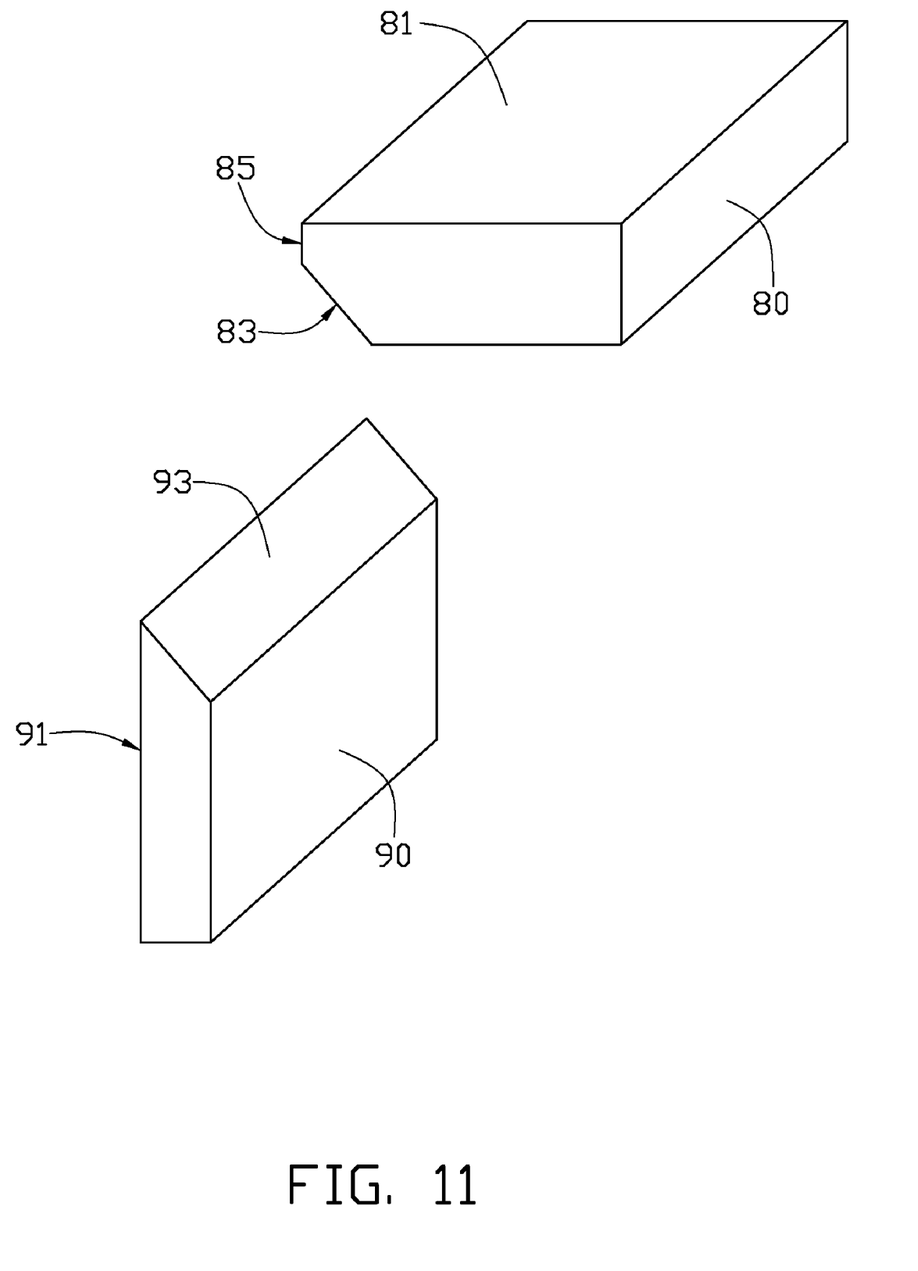
FIG. 11 is a schematic view of a seventh workpiece and an eighth workpiece to be joined.
Figure 12:
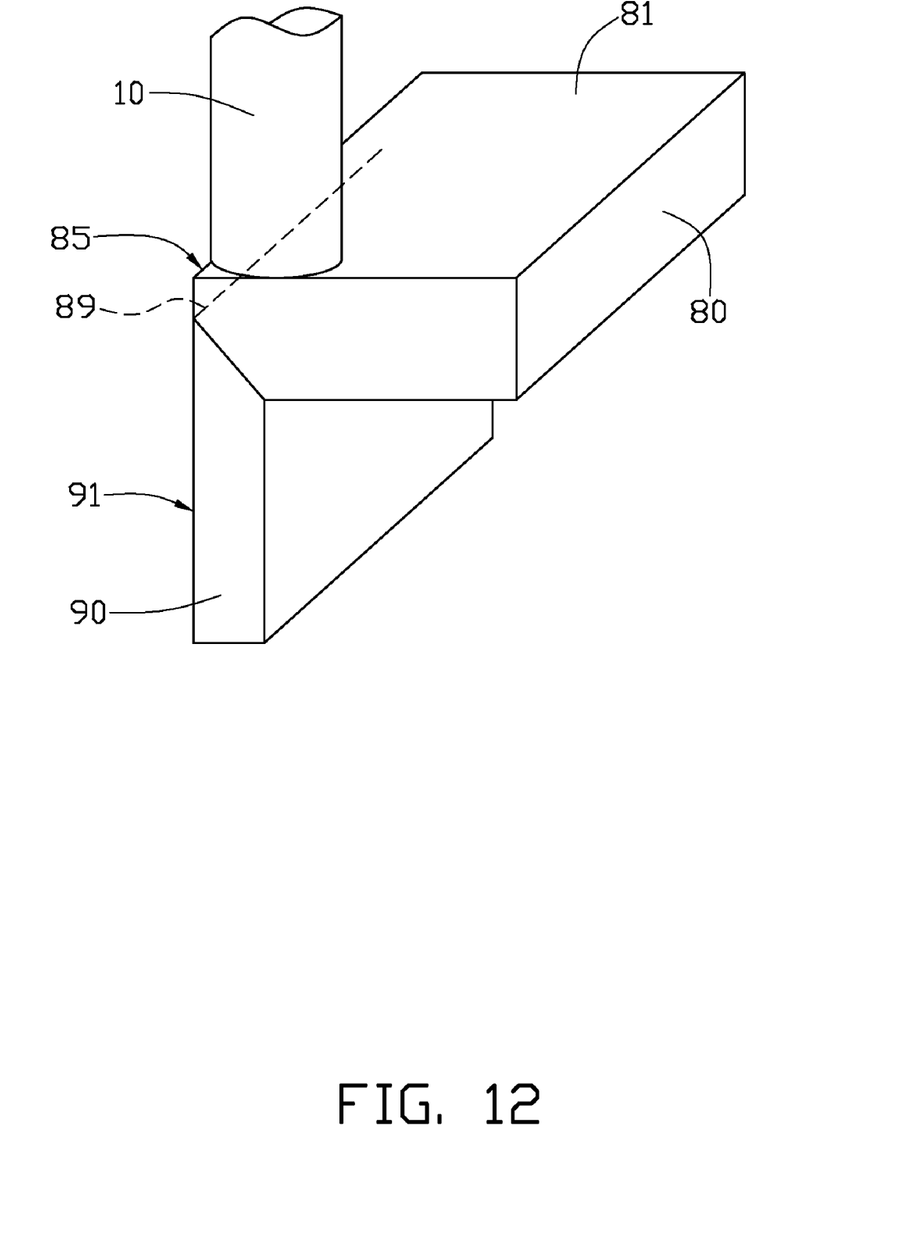
FIG. 12 is a schematic view showing the joining tool friction stirring the seventh workpiece and the eighth workpiece.

Referring to FIG. 11 and FIG. 12, a seventh workpiece 80 and an eighth workpiece 90 joined by the joining tool 10 are shown. The seventh workpiece 80 includes a seventh treating surface 81, a seventh joining surface 83 facing the seventh treating surface 81, and a connecting surface 85 connecting the seventh treating surface 81 and the seventh joining surface 83. The connecting surface 85 is substantially perpendicular to the seventh treating surface 81. The eighth workpiece 90 includes an eighth treating surface 91 and an eighth joining surface 93 facing the eighth treating surface 91. However, unlike the previous workpieces, the seventh treating surface 81 and seventh joining surface 83, and the eighth joining surface 93 and eighth treating surface 91 are non-perpendicular, disposed with an angle formed therebetween.

When joining of the seventh workpiece 80 and the eighth workpiece 90, the seventh workpiece 80 and the eighth workpiece 90 are arranged together and angled to each other. The seventh joining surface 83 contacts the eighth joining surface 93, and the seventh treating surface 81 and the eighth treating surface 91 are perpendicular to each other. A joint line 89 is defined at the joining portion of the seventh workpiece 80 and the sixth workpiece 90. The seventh workpiece 80 and the eighth workpiece 90 are positioned in place by a clamp (not shown). The friction surface 11 of the joining tool 10 resists the seventh treating surface 81. The joining tool 10 rotates along the axis thereof relative to the seventh workpiece 80 and the eighth workpiece 90 and moves along the joint line 89. Thus, the joining tool 10 produces a local region of highly plasticized material of the seventh workpiece 80 and the eighth workpiece 90 which diffuse among each other. As such, the seventh workpiece 80 and the eighth workpiece 90 are joined.

After the seventh workpiece 80 is joined to the eighth workpiece 90, surface layers adjacent to the treating surfaces 81, 91 may be removed. Therefore, product formed by the above described friction stir welding method can provide favorable appearance, even if subsequent treatment, such as an anodic process. When a removed layer of the eighth workpiece 90 is thinner than that of the seventh workpiece 80, the joint line 89 may be at a corner, that is, superposed to an edge line of the joined seventh workpiece 80 and the eighth workpiece 90, thus hidden.

The workpieces 20, 30, 40, 50, 60, 70, 80, 90 may be a material with low melting point, such as aluminum, aluminum alloy, copper alloy, or rubber, and be of any shape. Material of the joining tool 10 is a critical factor determining material of the workpieces 20, 30, 40, 50, 60, 70, 80, 90. Increased melting point of the joining tool 10 allows a higher melting point of the material of the workpieces 20, 30, 40, 50, 60, 70, 80, 90. The melting point of the joining tool 10 must exceed that of the workpieces 20, 30, 40, 50, 60, 70, 80, 90. Joining portions of the workpieces may be point, line or surface.

The disclosed joining method provides products with lower requirements for joint strength. If a product with strong joint strength is desired, the workpieces may define a slot at the joining portion in which a joining member with a melting point lower than the workpieces is received. The joining member is disposed away from the rubbed and stirred portion of the workpieces, thus the joining member may transmit heat to material far away from the rubbed and stirred portion. Therefore, a joining strength may be enhanced. A joining member provided to join the fifth workpiece 60 and the sixth workpiece 70 is discussed as follows.

Figure 13:
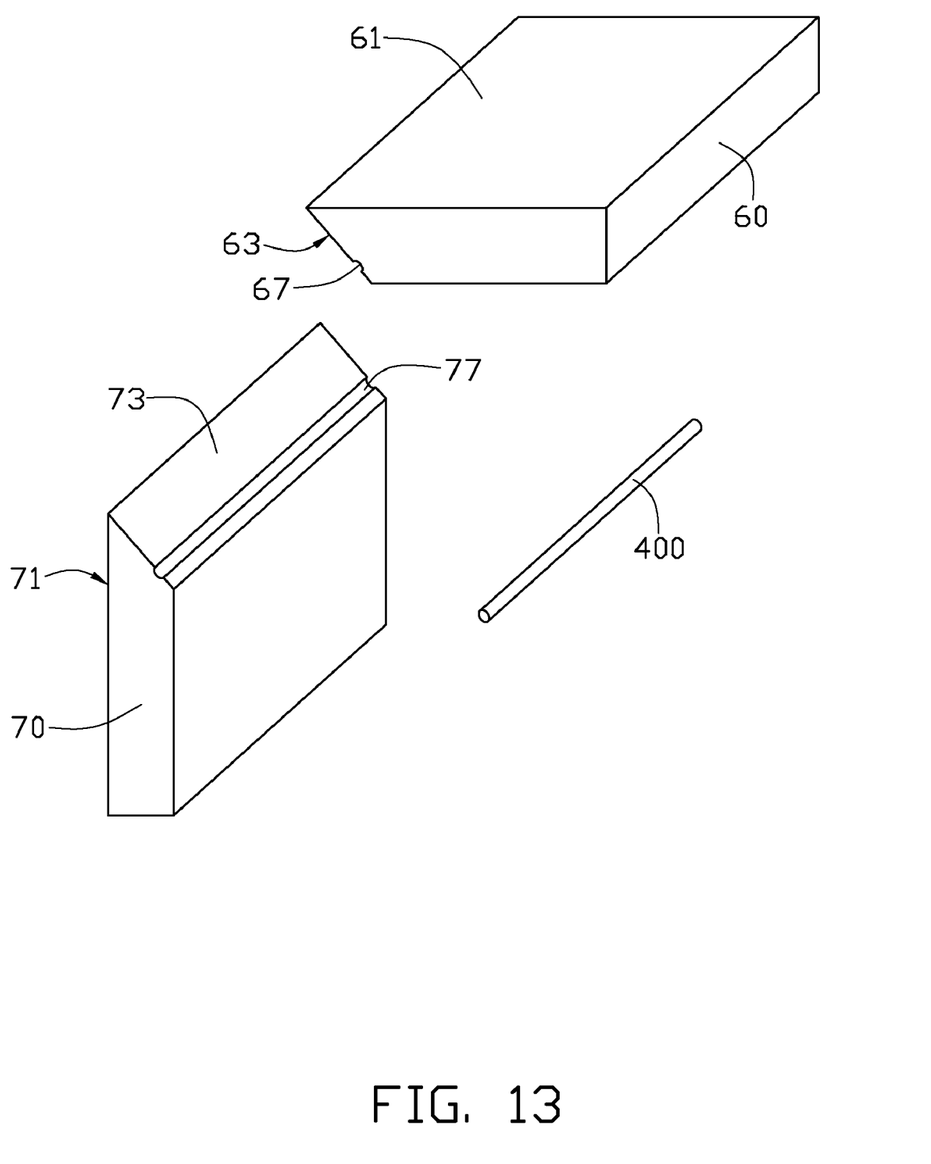
FIG. 13 is a schematic view of the fifth workpiece and a sixth workpiece to be joined and a joining member.
Figure 14:
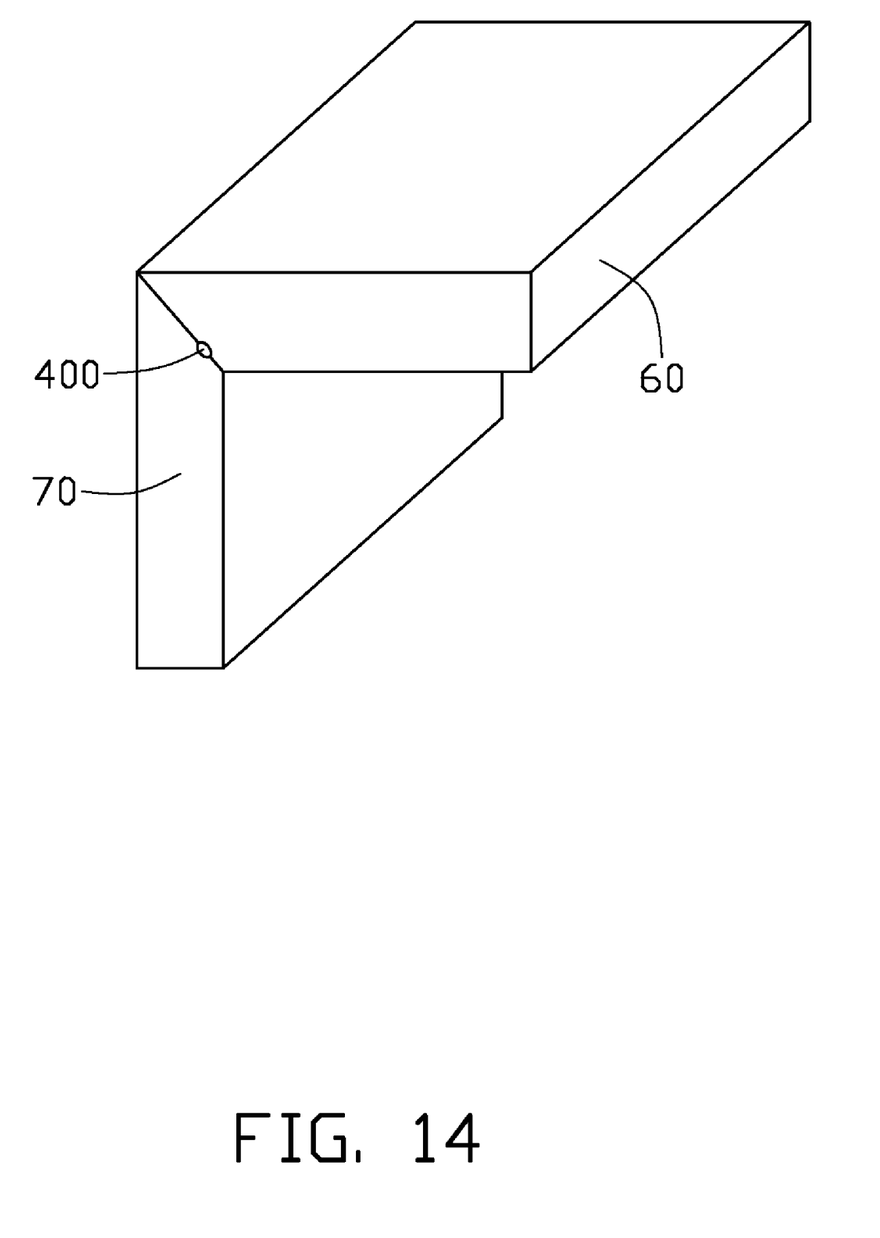
FIG. 14 is a schematic view showing the fifth workpiece and the sixth workpiece joined.

Referring to FIG. 13 and FIG. 14, the fifth workpiece 60 defines a first slot 67 at the fifth joining surface 63 and the sixth workpiece 70 defines a second slot 77 at the sixth joining surface 73. When the fifth workpiece 60 and the sixth workpiece 70 are arranged together, the first slot 67 and the second slot 77 cooperatively form a receiving slot (not labeled). To join the fifth workpiece 60 and the sixth workpiece 70, a joining member 400 is positioned in the receiving slot. When rubbing and stirring the fifth treating surface 61 of the fifth workpiece 60, heat is transmitted to the receiving slot, and the material of the joining member 400 becomes plasticized before the fifth workpiece 60 and the sixth workpiece 70 because the joining member 400 has a lower melting point. Heat transmitted adjacent to the receiving slot may not raise a temperature adjacent to the receiving slot to that of the fifth workpiece 60 and the sixth workpiece 70, while raising the temperature to the melting point of the joining member 400. Thus, material of the joining member 400 flows in the receiving slot to join with the fifth workpiece 60 and the sixth workpiece 70 to enhance the joining strength of the fifth workpiece 60 and the sixth workpiece 70.

Alternatively, the receiving slot may be only defined in one of the fifth workpiece 60 and the sixth workpiece 70. A joining member 400 may be positioned in each of the fifth workpiece 60 and the sixth workpiece 70. The joining member 400 may be solder.

In the disclosed friction stir welding methods, only the joining portions of the workpieces need be machined, such that the joining tool 10 is small, with a correspondingly low driving force thereof required. Equipment applying the joining tool 10 to friction stir welding is simple and low cost.

The joining tool 10 may be applied in ordinary machining centers (not shown), whereby workpieces may be machined and joined at the same machining center. As such, the workpieces need only be clamped once, thus improving machining efficiency and precision. In addition, no special machine is needed. Furthermore, the friction stir welding method can join workpieces with complex joining surfaces.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A friction stir welding method, comprising:
providing a joining tool comprising a friction surface;
providing a first workpiece comprising a first treating surface, a first joining surface, and an inclined connecting surface joining the first treating surface and the first joining surface;
providing a second workpiece comprising a second treating surface, a second joining surface, and an inclined connecting surface joining the second treating surface and the second joining surface;
providing a joining tool comprising a friction surface for rubbing and stirring the first treating surface and the second treating surface, wherein the joining tool is substantially cylindrical, and the friction surface is formed at a bottom end of the joining tool;
arranging the first workpiece and the second workpiece such that the first joining surface abuts the second joining surface, and the connecting surface of the first workpiece and the connecting surface of the second workpiece cooperatively define a slot facing the joining tool, and the width of the friction surface is larger than that of the slot;
positioning the friction surface of the joining tool to resist at least one of the first treating surface and the second treating surface; and
rotating and moving the joining tool to rub and stir the first treating surface of the first workpiece and the second treating surface of the second workpiece by the friction surface, until at least part of the first workpiece and the second workpiece are plasticized and joined together, wherein during rubbing and stirring of the first workpiece and second workpiece, some plasticized material flows into and fills the slot.

2. The friction stir welding method of claim 1, further comprising a step of removing a surface layer of the rubbed and stirred first workpiece or second workpiece, after joining the first workpiece and the second workpiece.

3. The friction stir welding method of claim 2, wherein the removed material is material which changed in metal structure from rubbing and stirring.

4. The friction stir welding method of claim 2, wherein surface layers of both the first workpiece and the second workpiece are removed.

5. The friction stir welding method of claim 1, wherein the joining tool defines a slot in the friction surface.

6. The friction stir welding method of claim 5, wherein the slot of the joining tool is spiral.

7. The friction stir welding method of claim 5, wherein the slot of the joining tool is curved slots originating at a rotation axis of the joining tool.

* * * * *